United States Patent [19]

Righi

[11] 4,223,898
[45] Sep. 23, 1980

[54] RETAINER DEVICE FOR CHUCK JAWS

[75] Inventor: Nerio Righi, 6, Via Zacconi, Casalecchio di Reno, Italy

[73] Assignees: Rivelica S.n.C. di Limoni Clindo; Adriano Del Cario; Nerio Righi, all of Bologna, Italy

[21] Appl. No.: 964,723

[22] Filed: Nov. 29, 1978

[51] Int. Cl.³ .............................................. B23B 31/00
[52] U.S. Cl. ................................. 279/1 R; 279/110; 51/237 R; 269/157
[58] Field of Search ............... 279/110, 114, 1 A, 1 L, 279/123, 1 R; 269/37, 157; 51/237 R, 90

[56] References Cited

U.S. PATENT DOCUMENTS

| 1,812,006 | 6/1931 | Jellicoe | 279/1 L X |
| 2,825,572 | 3/1958 | Sloan et al. | 279/1 L X |
| 2,925,282 | 2/1960 | Borsetti | 279/133 |

Primary Examiner—Gil Weidenfeld
Attorney, Agent, or Firm—Lowe, King, Price & Becker

[57] ABSTRACT

A retainer device which is adapted to block temporarily in a predetermined relative position the hard-steel jaws of a chuck comprises a carrier ring on which there are slidably mounted and lockable in radial direction, a plurality of blocking slides, each slide carrying a double-hook element presenting two inwardly directed hook arms. Upon adaptation of the retainer device frontally against the chuck jaws, each double-hook element engages from both sides, with the said inwardly directed arms, the clamping head portion of a corresponding chuck jaw, thus blocking the jaws in the desired working condition at which their gripping surfaces can be ground true with respect to the workpiece that is to be supported therein.

7 Claims, 4 Drawing Figures

RETAINER DEVICE FOR CHUCK JAWS

BACKGROUND OF THE INVENTION

(1) Field of the invention

The present invention relates to a device for temporarily retaining a plurality of relatively movable chuck jaws in a predetermined relative position. The device according to the invention is particularly adapted to block the jaws of a chuck in a desired working condition at which their clamping surfaces may be ground true, i.e. the surfaces of the head portions of the jaws which grip the workpiece therebetween are accurately positioned for a grinding operation, in order that said surfaces are ground true with respect to the workpiece that is to be supported therein. The device according to the invention is particularly adapted for retaining in a predetermined position the chuck jaws which are made completely of hard steel, and do not present a mild-steel jaw insert.

(2) Prior art devices

There are known retainer devices which are used for retaining in position the composite jaws of a chuck, i.e. the jaws which present a support portion made of hard steel onto which there is changeably mounted a gripper portion, or clamping head portion. The gripper portion directly comes into contact and engages the workpiece to be positioned on the chuck. This gripper portion is made of mild steel (or any other metal which can be easily machined). The mild-steel gripper portion of the jaw is usually made in the form of a jaw insert which presents frontal bores which can be engaged by locking pins provided on blocking slides radially movable on a carrier ring which is positioned frontally with respect to the chuck. The locking pins of this prior art arrangement are set at a predetermined relative position and lock the jaws (through the engagement with the bores provided in the mild-steel jaw insert) in a correspondingly predetermined relative position, after which the mild-steel jaw inserts can be machined, as by turning or grinding, as required for gripping the workpiece therebetween in an optimum manner.

Statement of the prior art

The following prior art is cited by the applicant, as the closest prior art of which he is aware:
Swiss Patent No. 417,276: the whole document.
U.S. Pat. No. 2,925,282: the whole document.
U.S. Pat. No. 3,028,169: the whole document.

SUMMARY OF THE INVENTION

According to the present invention, there is provided a retainer device which is particularly adapted to block in a predetermined position the hard-steel jaws of a chuck. The device comprises a carrier ring, on which there are slidably mounted and lockable in the radial direction, a plurality of blocking slides, each slide carrying a double-hook element presenting two inwardly directed hook arms. When the retainer device is installed against the chuck jaws, each double hook element engages from both sides, with the said inwardly directed points, the clamping head portion of a corresponding hard-steel jaw, thus blocking the jaws in the desired working condition at which their gripping surfaces can be ground true with respect to the workpiece that is to be supported therein.

The above and other features of the invention, and the advantages deriving therefrom, will appear evident from the following detailed description of a preferred embodiment of same, made with reference to the attached sheets of drawings.

DESCRIPTION OF THE PREFERRED EMBODIMENT

Figure 1:
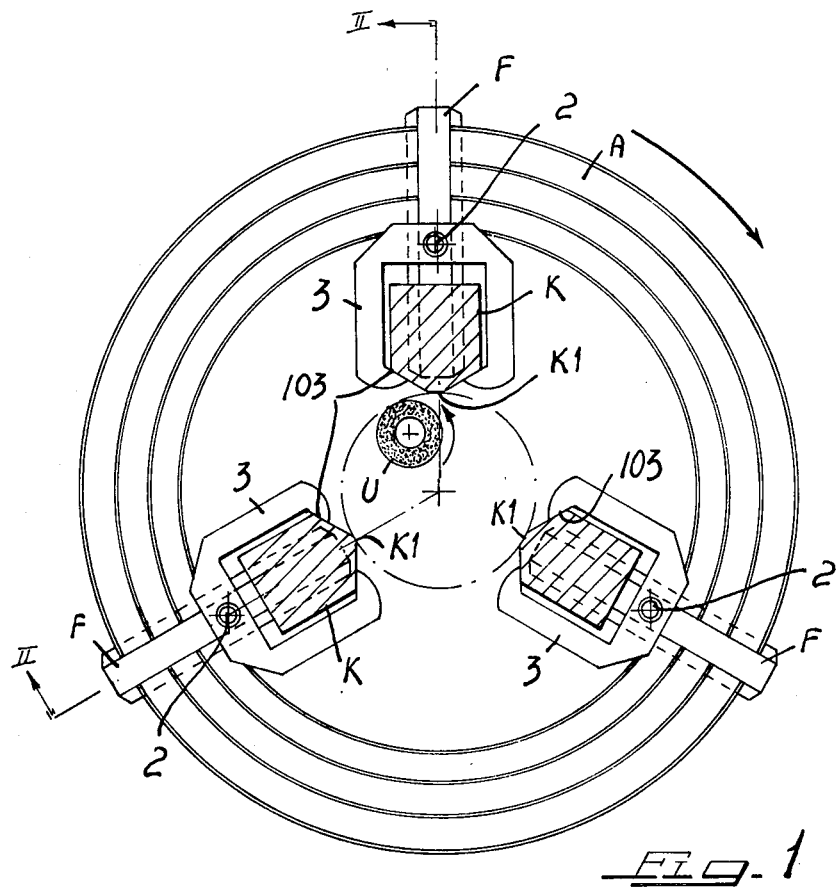
FIG. 1 is a frontal view of the retainer device according to the invention.

In the drawings, there is shown a device for retaining temporarily a plurality of movable jaws K of a self-centering chuck M. The retainer device presents a carrier ring A which can be applied coaxially to the chuck M against its jaws K and which presents on its rear side, i.e. on the side facing away from the chuck M, an annular groove. In this groove there is rotatably mounted a positioning ring B which presents on its outer peripheral surface an annular groove B1. The annular groove B1 is engaged by a locking pin D mounted on the carrier ring A, so as to permit rotation of the positioning ring B with respect to the carrier ring A, while laterally retaining said ring B on said ring A.

On the front or forward side of the carrier ring A, i.e. on the side which faces the chuck M, there are provided at angularly equispaced angles (120°), three slides F which are slidably mounted in corresponding radial guides opening into the annular groove provided on the rear side of the carrier ring A. The positioning ring B presents on its inner side, i.e. the side directed toward the chuck M, a scroll groove which is engaged by the teeth E of the blocking slides F. Upon rotation of the positioning ring B, the three blocking slides F can be radially moved simultaneously towards the exterior or towards the interior. In order to manually rotate the positioning ring B, a knurled peripheral surface B2, adapted to be gripped by hand is provided.

Each blocking slide F is provided on its front side, i.e. on the side directed towards the chuck M, with a double-hook element 3 which is U-shaped and presents two inwardly directed hook arms. Each double-hook element 3 is arranged on the blocking slide F with its open side directed towards the axis of the chuck M. The hook element is secured to the said blocking slide F by means of a screw 2 which engages a corresponding threaded bore 1 of the blocking slide F. The arrangement is such as to leave a limited possibility of oscillation of the hook element 3 around the said screw 2.

Each double-hook element 3 engages a corresponding jaw K of the chuck M with the inwardly directed hook arm that terminates at a point. More particularly, as it can be appreciated from FIG. 4, each inwardly directed arm of the double-hook element 3 presents an inner flat surface 103 having the same inclination as the inclined surfaces of the clamping head portion of the jaws K, so as to establish the maximum contact surface. The clamping surface K1 of each jaw K, which is to be ground true under the action of a suitable grinding tool U, projects freely out of the two inwardly directed arms of the double-hook element 3.

Figure 2:
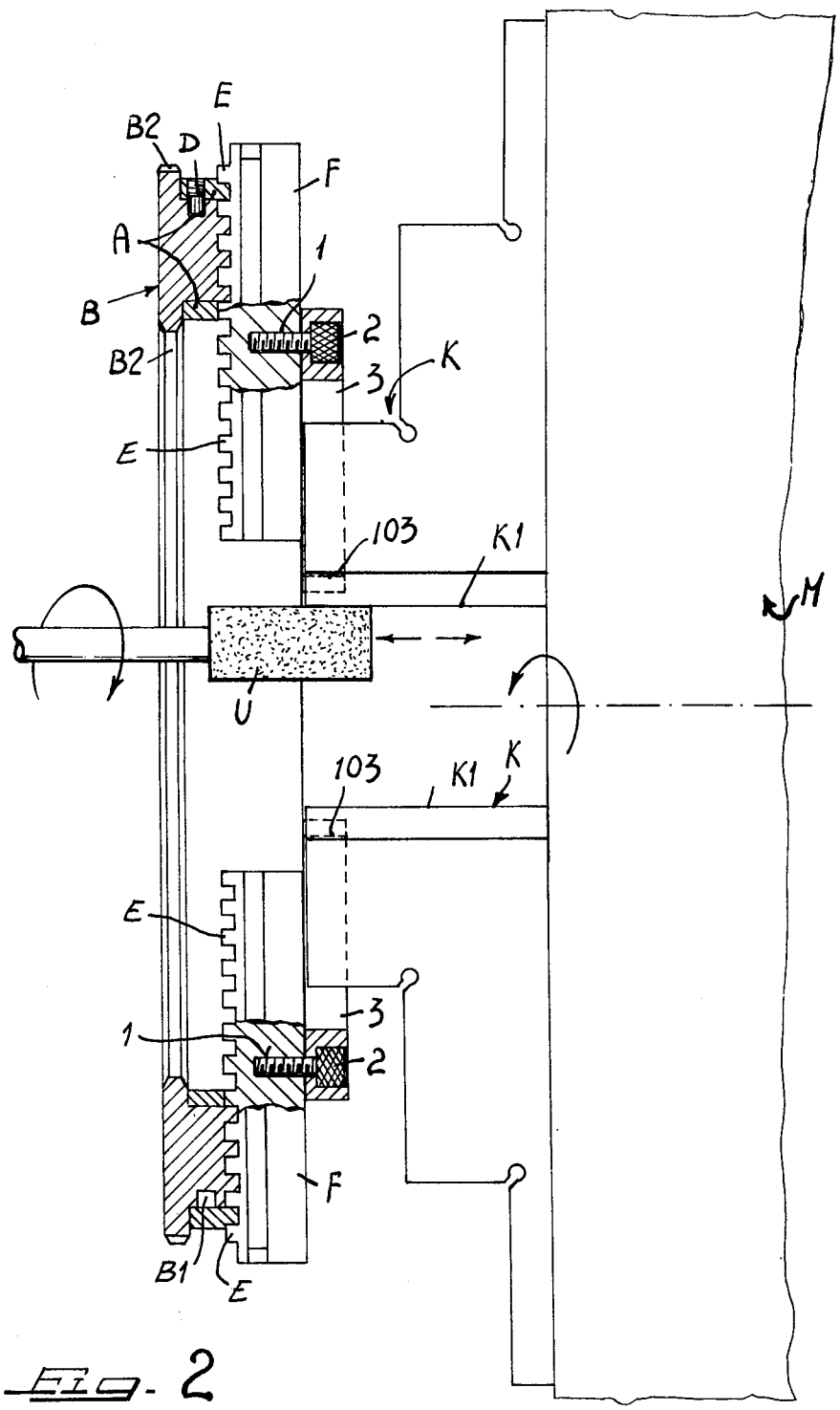
FIG. 2 is a section along lines II—II of FIG. 1, in an enlarged scale.

In the operation of the above described retainer device, after having applied the device to the jaws K of the chuck, the positioning ring B is rotated in such a manner as to cause the outward sliding of the blocking slides F. The retainer device is then moved toward the chuck M until the double-hook elements 3 engage and block the jaws K in the desired working condition at which their clamping surfaces are to be ground true with respect to the workpiece that is to be supported therein. Finally, a suitable grinding tool (or turning tool) is caused to operate at the interior of the thus defined clamping zone to grind the surfaces K1. To do this the tool moves, in a direction which is parallel to the chuck axis, while the chuck is rotated (see arrows in FIG. 2).

Figure 4:
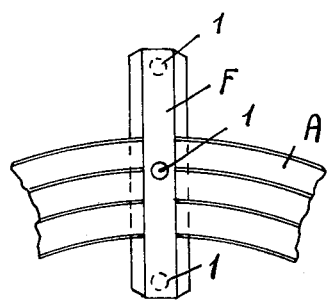

The blocking slides F can present just one threaded bore 1 (see FIG. 1) for securing, through screw 2, the hook element 3, or, as shown in FIG. 4, said elements may present a plurality (for example, three) of such threaded bores 1, which allows securing the hook element at different radial positions.

Figure 3:
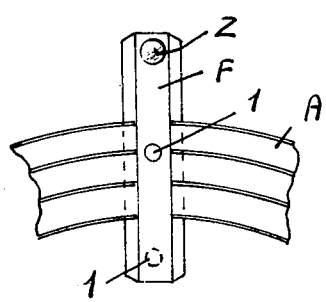
FIGS. 3 and 4 illustrate two different embodiments of a blocking slide adapted to be used in the retainer device according to the invention.

The retainer device according to the invention can also be used for retaining the chuck jaws which present a hard-steel jaw body and a mild-steel jaw insert, which jaw insert is intended to come into contact with the workpiece to be gripped by the chuck, and which is interchangeable with other inserts. This mild-steel jaw insert presents a frontal bore, which is engaged by a locking pin Z provided on one end of the blocking slide F (see FIG. 3). When the retainer device is used for the retention of chuck jaws presenting a mild-steel insert, the hook element 3 is detached from the blocking slide F and the locking pin Z is utilized for engagement with the frontal bore. Should it be necessary, the engaging pin Z may be positioned adjacent the interior of the inner circumference of carrier ring A, by turning the slide F upside down. Of course, when the hook element 3 is to be secured again on the blocking slide, the said slide must be again turned upside down, so that the engaging pin Z is positioned radially to the exterior, and does not interfere with the hook element. Alternately, the engaging pin Z may be provided with a threaded shank, so that it can be secured to the blocking slide F at any desired position, and detached, by screwing off, when a hook element is to be secured in its place.

Of course, the double-hook element 3 can be made of one piece with the blocking slide, but it is better to have it mounted by means of a screw 2 which allows, as above mentioned, a limited possibility of swinging of the hook element around the screw axis, thus permitting a perfect alignment of the hook element with the jaw engaged thereby. This provides an optimum engagement between the two parts, independently from any small imperfection or deviation of the radial alignment of the chuck jaws and of the blocking slides which carry the hook elements.

It is believed that the invention will have been clearly understood from the foregoing detailed description of one preferred embodiment. Changes in the details of construction may be resorted to without departing from the spirit of the invention, and it is accordingly intended that no limitation be implied and that the hereto annexed claims be given the broadest interpretation to which the employed language fairly admits.

I claim:

1. A device for temporarily retaining a plurality of relatively movable chuck jaws of a chuck in a predetermined relative position, comprising
    a carrier ring;
    at least two spaced blocking slides mounted for radial movement on said ring;
    means for adjusting the radial position of said slides; and
    a double-hook element mounted on each slide and having opposed hook arms;
    said opposed hook arms of each hook element having means for engaging opposite sides of the corresponding chuck jaws for radially retaining said chuck jaws in a fixed relative position with the adjusted position of said slides.

2. The retainer device of claim 1 wherein removable means are provided for mounting said double-hook element on each blocking slide.

3. The retainer device of claim 2 wherein said removable means comprises a screw extending through said hook element and a threaded bore on said slide to receive said screw.

4. The retainer device of claim 2, in which the blocking slide includes at least two threaded bores in order to permit the mounting of the double-hook element on the said blocking slide at different radial positions with respect to the axis of the chuck.

5. The retainer device of claim 1 wherein the double-hook element is swingably mounted on the blocking slide.

6. The retainer device of claim 1 wherein said engaging means includes inner surfaces on the inwardly directed arms of each double-hook element, said surfaces being inclined with the same inclination as the correspondingly engaged surfaces of the chuck jaw.

7. The retainer device of claim 1 wherein a locking pin is provided on each said slide adjacent the end opposite from said hook element, said locking pin adapted to engage a bore provided in the side surface of a mild-steel jaw insert, said blocking slide being reversible to alternately position said locking pin in operative position adjacent said jaw insert and in inoperative position away from said jaw insert.

* * * * *